(12) United States Patent
Hiraga et al.

(10) Patent No.: US 11,273,810 B2
(45) Date of Patent: Mar. 15, 2022

(54) VEHICLE CONTROL DEVICE

(71) Applicant: HITACHI AUTOMOTIVE SYSTEMS, LTD., Hitachinaka (JP)

(72) Inventors: Naoki Hiraga, Ibaraki (JP); Toshiyuki Innami, Ibaraki (JP); Junya Takahashi, Tokyo (JP); Seiichi Satoh, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 344 days.

(21) Appl. No.: 16/090,806

(22) PCT Filed: Jun. 2, 2017

(86) PCT No.: PCT/JP2017/020602
§ 371 (c)(1),
(2) Date: Oct. 2, 2018

(87) PCT Pub. No.: WO2017/217256
PCT Pub. Date: Dec. 21, 2017

(65) Prior Publication Data
US 2020/0324748 A1    Oct. 15, 2020

(30) Foreign Application Priority Data
Jun. 15, 2016   (JP) .............................. JP2016-118523

(51) Int. Cl.
*B60T 8/26* (2006.01)
*B60T 7/22* (2006.01)
(Continued)

(52) U.S. Cl.
CPC .................. *B60T 8/26* (2013.01); *B60T 7/22* (2013.01); *B60T 8/246* (2013.01); *B60T 8/321* (2013.01);
(Continued)

(58) Field of Classification Search
CPC ... B60T 8/26; B60T 7/22; B60T 8/246; B60T 8/3205; B60T 8/321; B60T 8/58;
(Continued)

(56) References Cited

U.S. PATENT DOCUMENTS

| 5,282,674 A * | 2/1994 | Matsuda | ............... B60T 8/1755 |
| | | | 303/113.5 |
| 6,056,374 A * | 5/2000 | Hiwatashi | ............... B60T 7/042 |
| | | | 303/193 |

(Continued)

FOREIGN PATENT DOCUMENTS

| EP | 2 236 376 A1 | 10/2010 |
| JP | H06-127354 A | 5/1994 |

(Continued)

OTHER PUBLICATIONS

Office Action issued in corresponding Japanese Patent Application No. 2018-523660 dated Jan. 28, 2020, with English translation.

(Continued)

*Primary Examiner* — Jelani A Smith
*Assistant Examiner* — Hana Lee
(74) *Attorney, Agent, or Firm* — Foley & Lardner LLP

(57) ABSTRACT

The present invention provides a vehicle control device that can reduce the delay in the deceleration response of a vehicle to a deceleration command. The present invention modifies the distribution ratio of brake fluid pressure between front brakes and rear brakes on the basis of lateral motion information, vehicle information, and a collision risk or a traveling scene obtained from information pertaining to the external surroundings. The brake fluid pressure is distributed to only one of the front brakes or the rear brakes.

9 Claims, 15 Drawing Sheets

(51) Int. Cl.
B60T 8/24 (2006.01)
B60T 8/32 (2006.01)
B60T 8/58 (2006.01)

(52) U.S. Cl.
CPC .............. B60T 8/3205 (2013.01); B60T 8/58 (2013.01); *B60T 2201/022* (2013.01); *B60T 2210/20* (2013.01); *B60T 2210/32* (2013.01); *B60T 2220/00* (2013.01); *B60T 2230/04* (2013.01)

(58) Field of Classification Search
CPC ........... B60T 2201/022; B60T 2210/20; B60T 2210/32; B60T 2220/00; B60T 2230/04; B60T 8/00; B60T 2201/03; B60W 10/18; B60W 30/09; B60W 30/0956; B60W 2420/42; B60W 10/184; B60W 30/095; B60W 30/08; B60W 30/0953; B60W 2554/801; B60W 2540/18; B60W 2520/14; B60W 2520/10; B60W 2520/12; G08G 1/166; G06K 9/00805
See application file for complete search history.

(56) References Cited

U.S. PATENT DOCUMENTS

| | | | | |
|---|---|---|---|---|
| 6,183,048 | B1* | 2/2001 | Takahira | B60T 7/122 303/113.1 |
| 9,517,756 | B2* | 12/2016 | Svensson | B60T 8/26 |
| 10,118,599 | B2* | 11/2018 | Dackermann | B60T 13/16 |
| 2004/0016594 | A1* | 1/2004 | Yasui | B60W 40/101 180/446 |
| 2004/0262990 | A1* | 12/2004 | Check | B60T 8/17616 303/113.1 |
| 2005/0236895 | A1* | 10/2005 | Matsumoto | B60T 8/17557 303/140 |
| 2006/0185928 | A1* | 8/2006 | Yamazaki | B62D 6/008 180/446 |
| 2007/0228822 | A1* | 10/2007 | Hirata | B60L 7/18 303/151 |
| 2009/0192675 | A1 | 7/2009 | Yamakado et al. | |
| 2009/0212935 | A1* | 8/2009 | Luo | B60Q 9/008 340/467 |
| 2013/0054128 | A1* | 2/2013 | Moshchuk | B60W 10/18 701/301 |
| 2013/0152569 | A1* | 6/2013 | Spieker | B60T 8/1755 60/327 |
| 2017/0305416 | A1 | 10/2017 | Yamakado et al. | |
| 2017/0358209 | A1* | 12/2017 | Ohmori | B60T 7/22 |

FOREIGN PATENT DOCUMENTS

| | | | |
|---|---|---|---|
| JP | 2006027573 A | * | 2/2006 |
| JP | 2006-256440 A | | 9/2006 |
| JP | 2009-214742 A | | 9/2009 |
| JP | 2016-068649 A | | 5/2016 |
| JP | 2017-149379 A | | 8/2017 |
| WO | WO-2014119171 A1 | * | 8/2014 ............ B60T 8/1766 |

OTHER PUBLICATIONS

Office Action issued in corresponding Chinese Patent Application No. 201780017826.0 dated Jul. 7, 2020, with English translation.
Extended European Search Report issued in corresponding European Patent Application No. 17813158.7 dated Jan. 15, 2020.
Office Action issued in Japanese Application No. 2018-523660 dated Aug. 6, 2019 with English translation.
International Search Report issued in corresponding application No. PCT/JP2017/020602 dated Oct. 3, 2017.

* cited by examiner

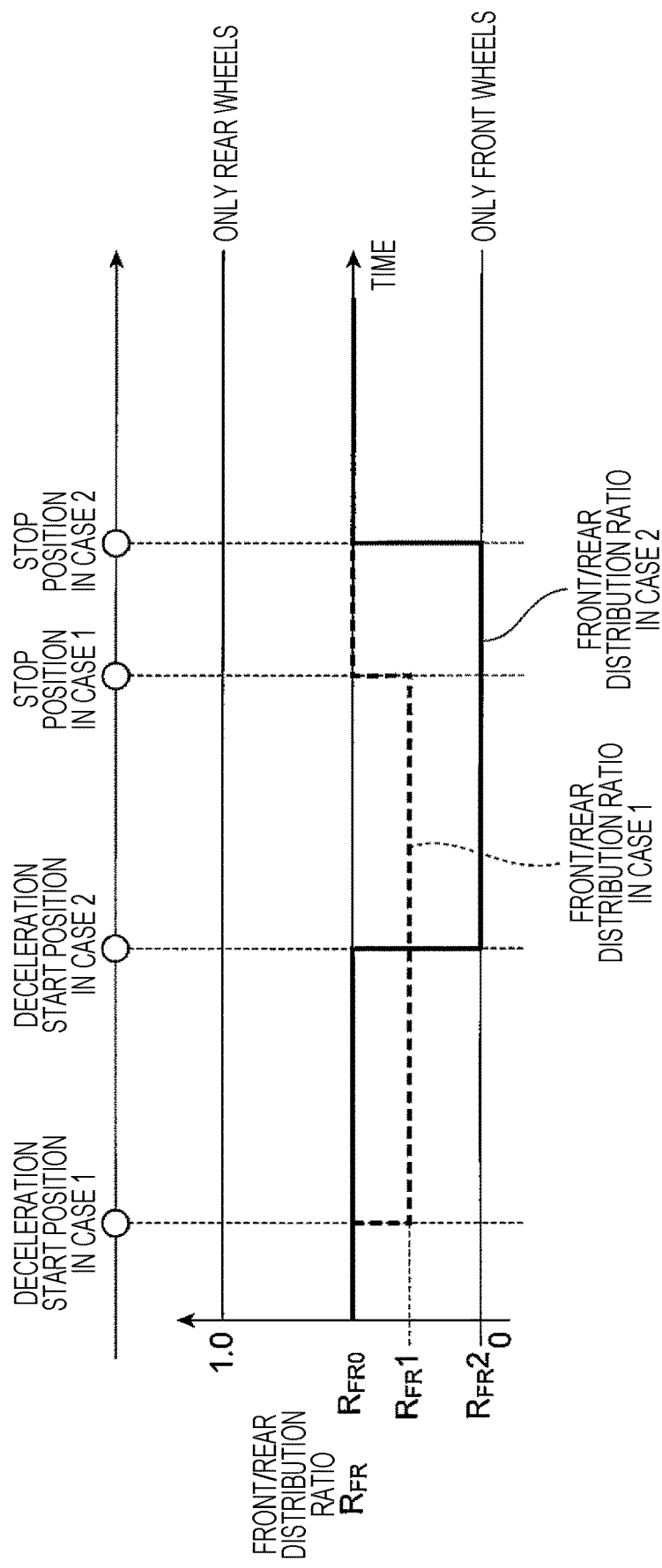

VEHICLE CONTROL DEVICE

TECHNICAL FIELD

The present invention relates to a vehicle control device, and particularly relates to a vehicle control device that controls the brake fluid pressure of a vehicle.

BACKGROUND ART

In recent years, technological development and mass production of advanced safety vehicles (ASV), which are vehicles equipped with systems that assist safe driving of drivers using advanced technologies, have been rapidly proceeding.

In the ASV technology, a collision-damage reduction brake is for predicting a collision with a preceding vehicle ahead of an own vehicle, a pedestrian, an obstacle, or the like obtained from a radar or a camera, and for automatically applying a brake to reduce a collision damage. In order to reduce such collision damage, the responsiveness from recognition of an obstacle and the like and issuing a deceleration command until the start of the actual braking of the vehicle is important.

In addition, as the ASV technology, Patent Literature 1 proposes a technique for improving the maneuverability and the stability of a vehicle by automatically accelerating and decelerating in association with lateral motion by steering wheel operation.

CITATION LIST

Patent Literature

PTL 1: JP 2008-285066 A

SUMMARY OF INVENTION

Technical Problem

In the collision-damage reduction brake and the technique disclosed in Patent Literature 1, by mainly giving a deceleration command to an Electronic stability control (ESC) which is a side-slip prevention device, and generating the brake fluid pressure at the four wheels of a vehicle to automatically apply the brake, the vehicle is controlled. However, when the same brake fluid pressure is generated at all the four wheels at all times, a delay in the time from giving a deceleration command until the vehicle starts to decelerate can occur. Furthermore, when the urgency is high, the vehicle cannot sufficiently decelerate, and the possibility of collision can be increased.

The present invention has been made in view of the above circumstances, and a purpose of the present invention is to provide a vehicle control device that can reduce a delay in the deceleration response of a vehicle to a deceleration command.

Solution to Problem

A vehicle control device according to the present invention is a vehicle control device that adjusts a distribution ratio of brake fluid pressure to brakes provided at front, rear, right, and left of a vehicle, and controls a traveling state of the vehicle, in which the distribution ratio of the brake fluid pressure between the front brakes and the rear brakes is changed based on a collision risk or a traveling scene of the vehicle.

Advantageous Effects of Invention

According to the present invention, it is possible to reduce a delay in the deceleration response of a vehicle to a deceleration command.

Problems, configurations, and effects other than those described above will be clarified from the description of the following embodiment.

BRIEF DESCRIPTION OF DRAWINGS

FIG. 16 is a diagram showing the difference in a front/rear distribution ratio of brake fluid pressure based on the difference between deceleration start distances with respect to an obstacle.

DESCRIPTION OF EMBODIMENT

Hereinafter, embodiments of the present invention will be described with reference to the drawings.

[Basic Concept of Control by Vehicle Control Device According to Present Invention]

First, a basic concept of control by a vehicle control device according to the present invention will be described.

In order to improve the responsiveness from a deceleration command until a vehicle starts to decelerate, the present invention relates to a technique for distributing brake fluid pressure to the front and the rear (the front brakes and rear brakes) according to external information, vehicle information, lateral motion information, and the like. The method for decelerating is not particularly limited, and may be performed by distributing brake fluid pressure to the front and the rear according to a driver's brake operation (driver operation), or by distributing brake fluid pressure to the front and the rear based on a collision-damage reduction brake or a deceleration command from a controller in the technique disclosed in Patent Literature 1.

Hereinafter, the effects of the control by the vehicle control device according to the present invention will be described in traveling scenes where steering operation is performed and steering operation is not performed when a deceleration command is generated.

<Effects in the Case where Steering Operation is not Performed>

First, a scene while a vehicle is traveling on a straight road (linear road) for which steering operation is not performed will be described.

Figure 1:
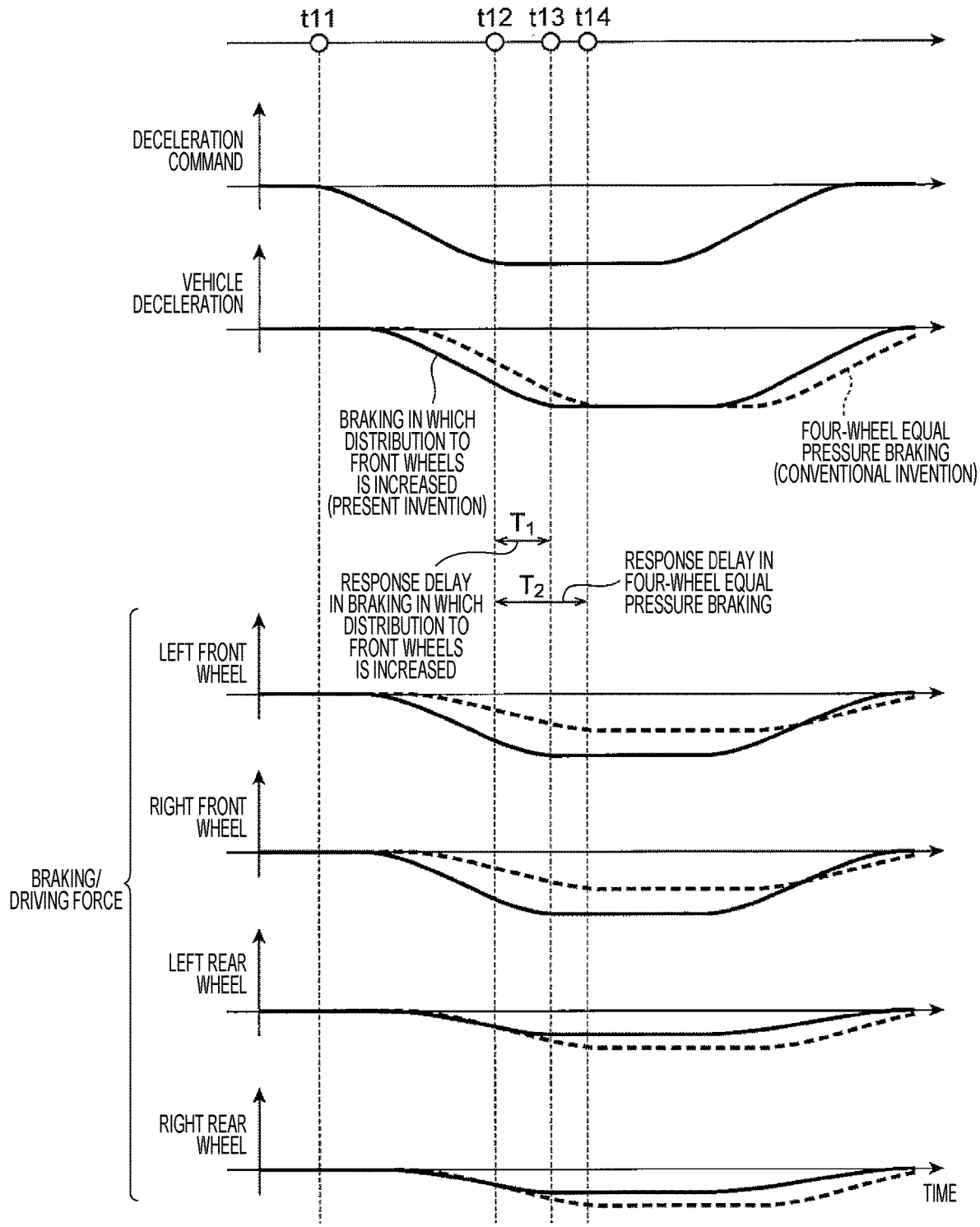
FIG. 1 is a diagram showing time-series data of the vehicle deceleration and the braking force of each wheel with respect to a deceleration command in control by a vehicle control device according to the present invention and in control by a conventional technique.
Figure 2:
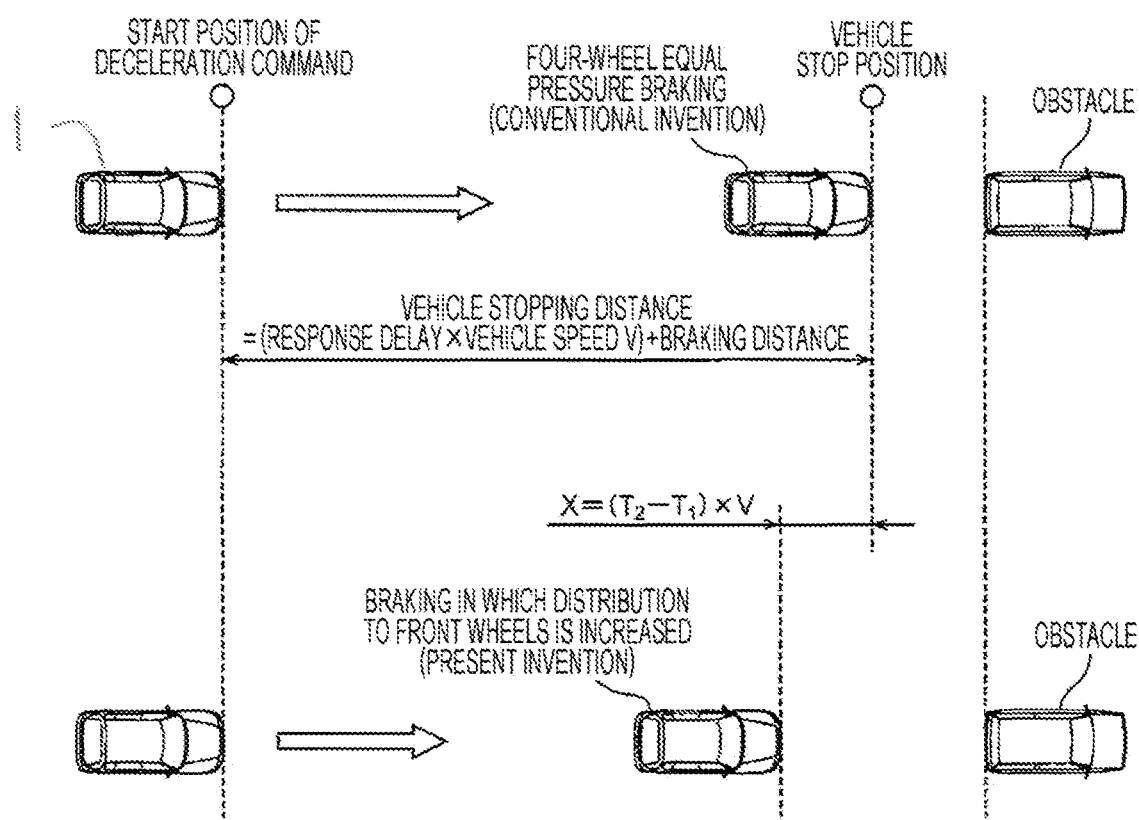
FIG. 2 is a diagram showing a vehicle stopping distance when a vehicle decelerates as shown in FIG. 1 while traveling on a straight road at vehicle speed V.

FIG. 1 shows examples of the vehicle deceleration and the braking force of each wheel (the left front wheel, the right front wheel, the left rear wheel, and the right rear wheel) with respect to a deceleration command when a driver or an external recognition sensor (to be described in detail later) recognizes a front obstacle (for example, a vehicle) and an own vehicle decelerates during traveling on a straight road; the dotted lines indicate four-wheel equal pressure braking in which the brake fluid pressure is equally generated at the four wheels (the control by a conventional technique), and the solid lines indicate the case in which the distribution ratio of (the brake fluid pressure) of the front wheels is increased (the control by the vehicle control device according to the present invention). FIG. 2 shows the difference between vehicle stopping distances as the effect of the present invention when the vehicle decelerates as shown in FIG. 1.

As shown in FIG. 1, in response to a deceleration command generated at t11, a response delay $T_2$ (from t12 to t14) occurs in the case of the four-wheel equal pressure braking, but the response delay is improved to a response delay $T_1$ (from t12 to t13) in the case where the distribution ratio of the brake fluid pressure of the front wheels is increased compared to the rear wheels. This is because the responsiveness is improved due to the following reason: a response delay occurs in the case of the four-wheel equal pressure braking since the pressure rising performance of the brake fluid pressure is insufficient due to the motor performance of an ESC or due to the limitation of the motor rotation speed of the ESC to prioritize the sound vibration performance, and since it takes time to reduce clearances between the pad and the rotor at the disc brake, and between the brake shoe and the inner face of the drum, whereas the amount of fluid to be generated at (the brakes of) the front wheels is increased in the case where the distribution ratio of the brake fluid pressure of the front wheels is increased compared to the rear wheels, and it is possible to generate the braking force in a short time. Thus, the difference X between the vehicle stopping distances shown in FIG. 2 is expressed as $X=(T_2-T_1) \times V$, and it is possible to stop the vehicle with the margin X to the obstacle by increasing the distribution ratio of the brake fluid pressure of the front wheels compared to the rear wheels.

<Effect in the Case where Steering Operation is Performed>

Next, the case where steering operation is performed will be described. Here, a scene in which a vehicle decelerates according to steering operation by the control for automatically accelerating and decelerating in association with the lateral motion by the steering operation disclosed in Patent Literature 1 to avoid a front obstacle (for example, a vehicle) is described. The control disclosed in Patent Literature 1 is referred to as G-Vectoring (trademark registration) control in which the locus of the resultant acceleration vector (G) of the longitudinal acceleration and the lateral acceleration is directed (vectored) so as to draw a smooth curve in the coordinate system in which the center of gravity of a vehicle is fixed. A specific acceleration/deceleration command value (a target longitudinal acceleration $G_{xc}$) is generally obtained by a simple control rule that lateral jerk $G_{y\_dot}$ is multiplied by a gain $C_{xy}$, and a primary delay of the obtained value is set as a longitudinal acceleration/deceleration command as shown in (Expression 1).

(Expression 1)

$$G_{xc} = -\text{sgn}(G_y \cdot \dot{G}_y)\frac{C_{xy}}{1+T_s}|\dot{G}_y| + G_{xDC} \qquad (1)$$

$$\text{※} \cdot \dot{G}_y = G_{y\_dot}$$

(Expression 1)

Note that, $G_y$ is the lateral acceleration of the vehicle, $G_{y\_dot}$ is the lateral jerk of the vehicle, $C_{xy}$ is the gain, T is the primary-delay time constant, s is the Laplace operator, $G_{xDC}$ is the acceleration/deceleration command, which is not associated with the lateral motion, corresponds to, for example, a pre-crash brake such as an automatic brake.

It has been confirmed in Patent Literature 1 that a part of the linkage control strategy of the lateral motion and the longitudinal motion of an expert driver can be simulated, and that the steering responsibility and the maneuvering stability of a vehicle can be improved.

Here, the above G-Vectoring control is acceleration/deceleration control, but the present traveling scene targets only the deceleration control.

Figure 3:
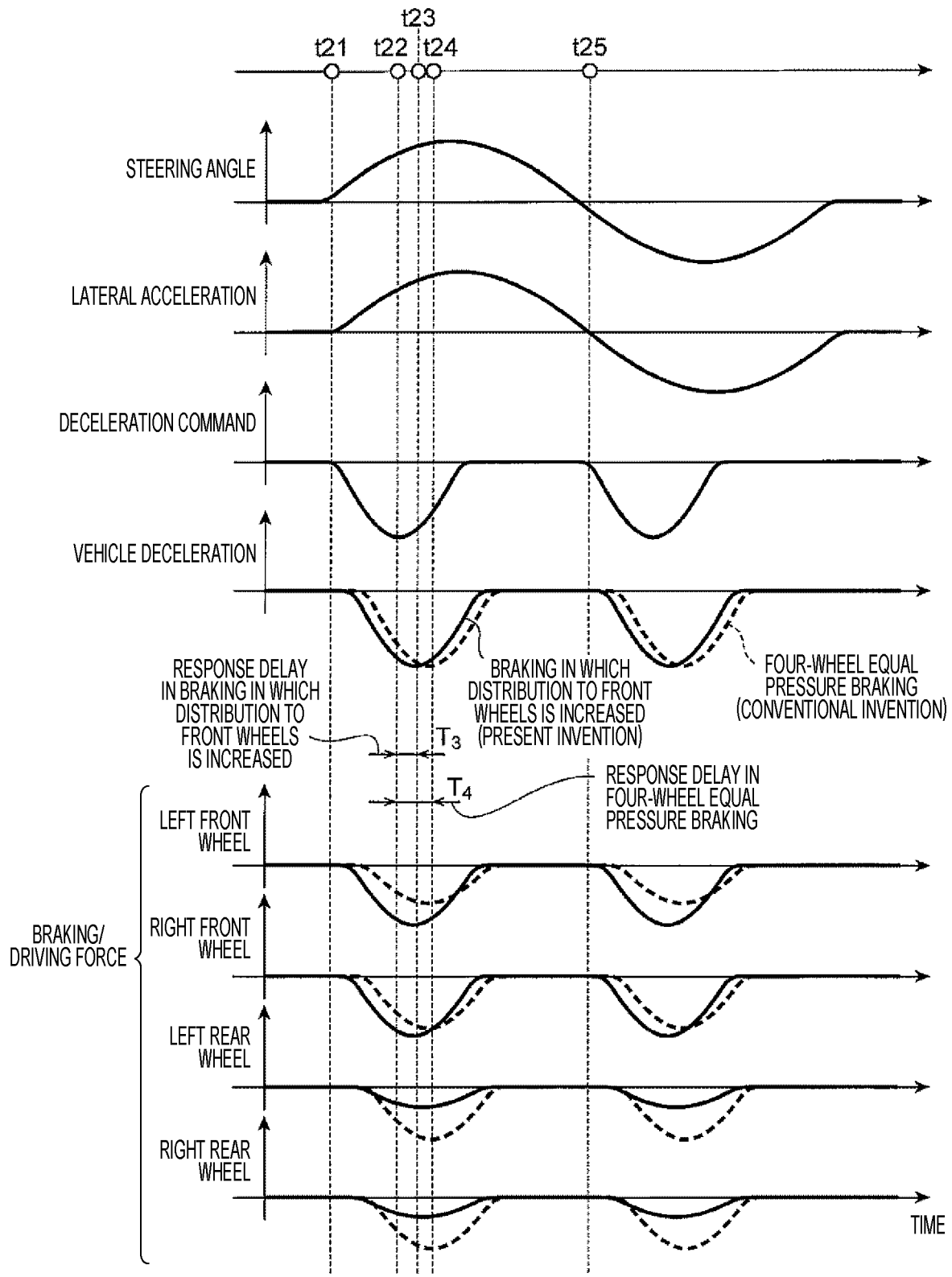
FIG. 3 is a diagram showing time-series data of the lateral acceleration, the deceleration command, the vehicle deceleration, and the braking force of each wheel with respect to a steering angle in the G-Vectoring (trademark registration) control with the control by the vehicle control device according to the present invention and with the control by the conventional technique.
Figure 4:
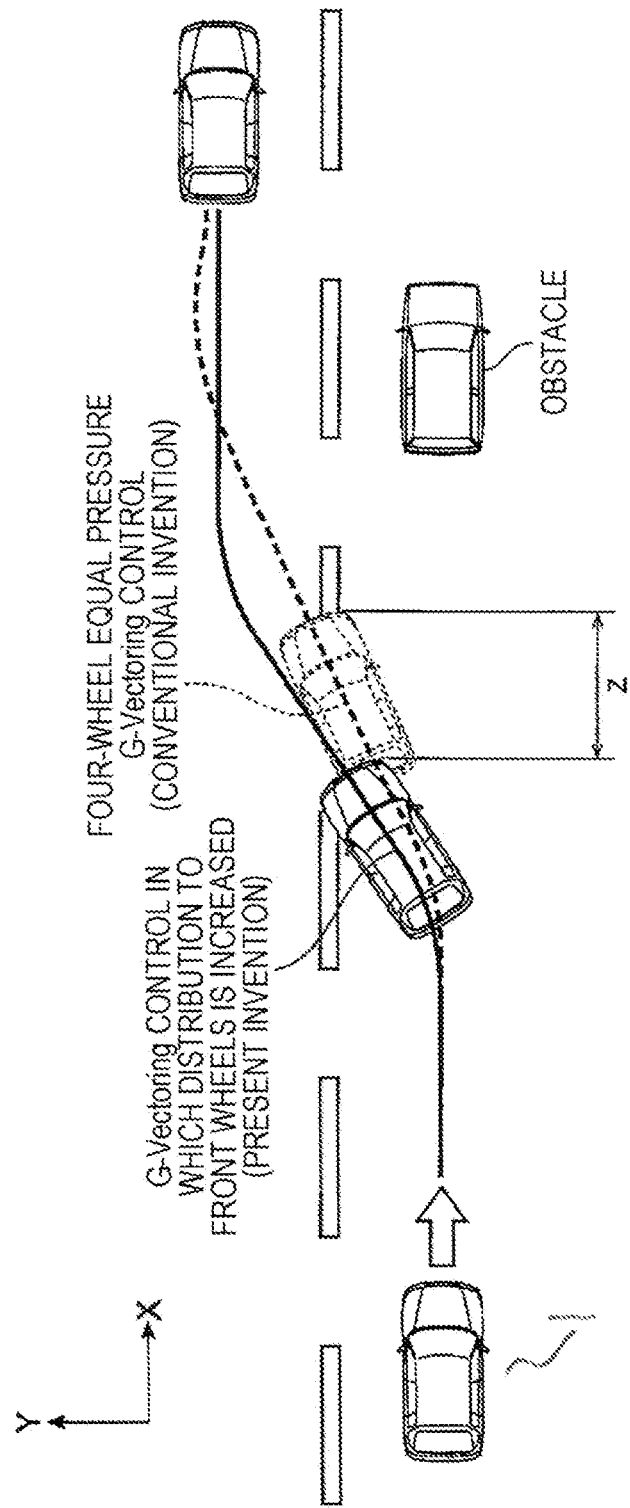
FIG. 4 is a diagram showing a positional relationship between an own vehicle and an obstacle when the vehicle avoids an obstacle by steering and deceleration shown in FIG. 3.

FIG. 3 shows examples of the lateral acceleration, the deceleration command calculated by (Expression 1), and vehicle deceleration, and the braking force of each wheel (the left front wheel, the right front wheel, the left rear wheel, and the right rear wheel) with respect to the steering angle when a driver or an external recognition sensor (to be described in detail later) recognizes a front obstacle (for example, a vehicle) and the driver maneuvers the steering wheel in order for an own vehicle to decelerate by the G-Vectoring control and avoids the obstacle during the vehicle is traveling on a straight road; the dotted lines indicate the four-wheel equal pressure braking in which the brake fluid pressure is equally generated at the four wheels (the control by the conventional technique), and the solid lines indicate the case in which the distribution ratio of (the brake fluid pressure) of the front wheels is increased (the control by the vehicle control device according to the present invention). FIG. 4 shows the positional relationship between the own vehicle and the obstacle as the effect of the present invention when the vehicle is steered and decelerates as shown in FIG. 3. In FIG. 3, it is assumed that the vehicle is steered to avoid the obstacle by changing the lane to the left as shown in FIG. 4.

As shown FIG. 3, when the response delay of the vehicle deceleration with respect to the deceleration command calculated based on the lateral acceleration generated at t21 according to the steering input is observed in each peak value, a response delay $T_4$ (from t22 to t24) occurs in the case of the four-wheel equal pressure braking, but the response delay is improved to a response delay $T_3$ (from t22 to t23) in the case where the distribution ratio of the brake fluid pressure of the front wheels is increased compared to the rear wheels.

This is because of the same reason as the reason in the case where steering operation is not performed.

Accordingly, the vehicle is easily turned inward in the turning direction (direction for avoiding the obstacle), and the margin distance Z from the vehicle to the obstacle in the X axis direction (traveling direction) is generated when avoiding the obstacle by steering as shown in FIG. 4. That is, by making the distribution ratio of the brake fluid pressure of the front wheels is increased compared to the rear wheels, it is possible to avoid the obstacle with a margin. In addition, when the distribution ratio of the brake fluid pressure of the front wheels is increased compared to the rear wheels, it is possible to smoothly avoid the obstacle (without extra bulging) as shown in FIG. 4.

Figure 5:
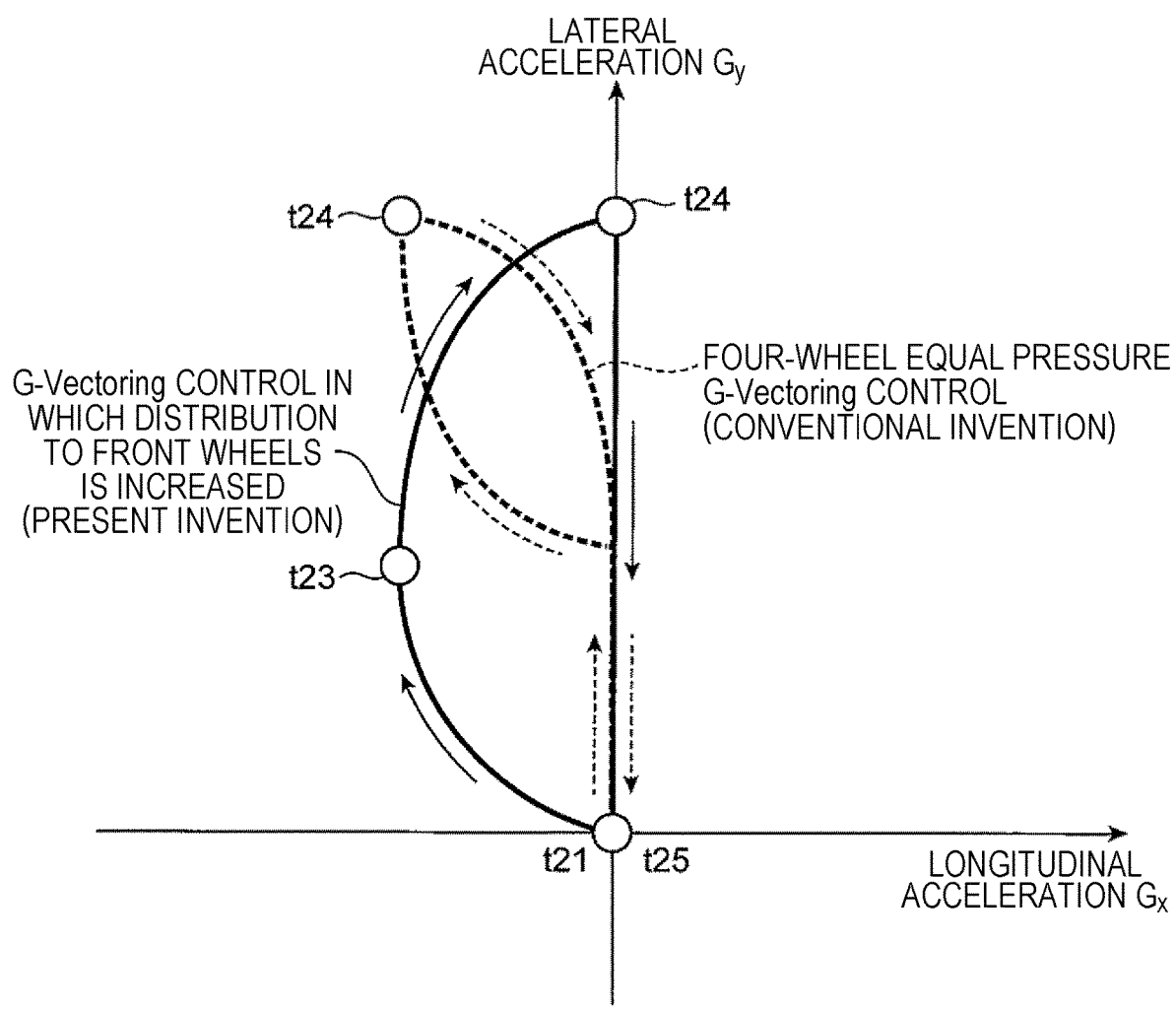
FIG. 5 is a diagram showing a "g-g diagram" represented by longitudinal acceleration $G_x$ and lateral acceleration $G_y$ when the vehicle avoids the obstacle by steering and deceleration shown in FIG. 3.

FIG. 5 shows a "g-g diagram" represented by the longitudinal acceleration $G_x$ and the lateral acceleration $G_y$ in which the generation of the vehicle deceleration with respect to the deceleration command is delayed when the brake fluid pressure is equally generated at the four wheels (the four-wheel equal pressure G-vectoring control), and the longitudinal acceleration $G_x$ and the lateral acceleration $G_y$ are not changed in association with each other as described in Patent Literature 1. In contrast, the delay in the vehicle deceleration with respect to the deceleration command is suppressed when the distribution ratio of the brake fluid pressure of the front wheels is increased (the G-Vectoring control with increased front-wheel distribution), and the longitudinal acceleration $G_x$ and the lateral acceleration $G_y$ are changed in association with each other, and a semicircle is drawn. It has been confirmed in Patent Literature 1 that the riding comfort of the driver is improved with the "g-g diagram" change in this manner.

The case where the control for increasing the distribution ratio of the brake fluid pressure of (the brakes of) the front wheels has been explained as an example, but the control may be performed so as to increase the distribution ratio of the brake fluid pressure of (the brakes of) the rear wheels. However, since the braking force of the brakes of the front wheels is generated earlier because of the structure, the effect of the responsiveness improvement is larger when the distribution ratio of the brake fluid pressure of the front wheels is increased compared to the rear wheels. In the case where steering operation is performed, the G-Vectoring control has been described as an example, but the control is not necessary to be the G-Vectoring control. However, with the G-Vectoring control, it is possible to improve the performance for avoiding an obstacle because the steering responsibility of the vehicle is improved as described above.

In the traveling scenes where steering operation is performed and steering operation is not performed, the effect of improving the responsiveness from the deceleration command until the vehicle starts to decelerate by changing the distribution ratio of the brake fluid pressure to the front brakes and the rear brakes compared to the case where the brake fluid pressure is equally generated at the four wheels has been described. Hereinafter, it will be described how to determine the distribution ratio of the brake fluid pressure to be generated at the front brakes and the rear brakes.

<Method for Determining Distribution Ratio of Brake Fluid Pressure>

Based on a collision risk obtained from external information, vehicle information, lateral motion information, and the like, it is determined how much deceleration responsiveness of the vehicle is needed for the deceleration command to determine the distribution ratio of the brake fluid pressure to the front brakes and the rear brakes (a front/rear distribution ratio $R_{FR}$).

Figure 6:
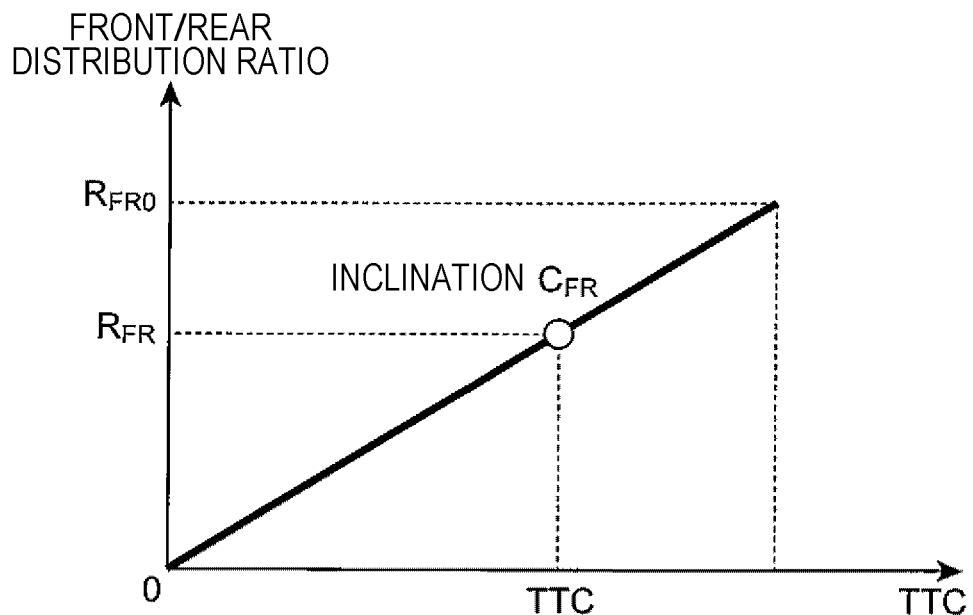
FIG. 6 is a diagram showing a map for determining a distribution ratio of brake fluid pressure between front brakes and rear brakes based on a TTC.

Specifically, as shown in FIG. 6, a two-dimensional map represented by a time to collision (TTC) to an obstacle in which the vertical axis represents the front/rear distribution ratio $R_{FR}$ and the horizontal axis represents a collision risk is prepared, and the front/rear distribution ratio $R_{FR}$ is determined according to inclination $C_{FR}$ by (Expression 2).

$$R_{FR} = C_{FR} \times TTC \qquad (2)$$

(Expression 2)

Figure 7:
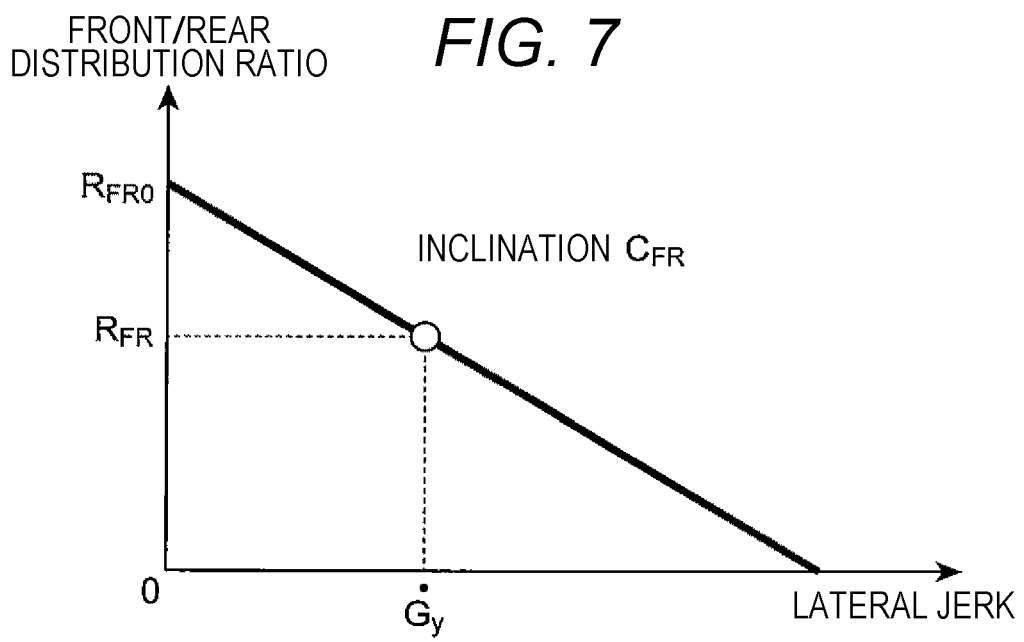
FIG. 7 is a diagram showing a map for determining a distribution ratio of brake fluid pressure between front brakes and rear brakes based on lateral jerk.

Here, as a collision risk, a TTC obtained from the external information is used as the horizontal axis, but the steering angular velocity, the yaw angular acceleration, the lateral jerk, the accelerator change speed, the brake change speed, and the like obtained from the vehicle information and the lateral motion information may be used as the index of the collision risk. However, since a collision risk becomes higher as the value of a TTC decreases, the inclination $C_{RF}$ is a positive value. Furthermore, since it can be determined that a collision risk becomes higher as the steering angular velocity, the yaw angular acceleration, the lateral jerk, the accelerator change speed, and the brake change speed are larger, when such values are used as the collision risk, the inclination $C_{FR}$ is to be a negative value as shown in the two-dimensional map of the distribution ratio with respect to the lateral jerk shown in FIG. 7. Each graph in FIGS. 6 and 7 shows, as an example, that the vertical axis represents the front/rear distribution ratio, the horizontal axis represents the collision risk, and the inclination is a constant value. However, a map having a change point (an inflection point) according to the collision risk may be used (see FIG. 15 to be described later).

Figure 8:
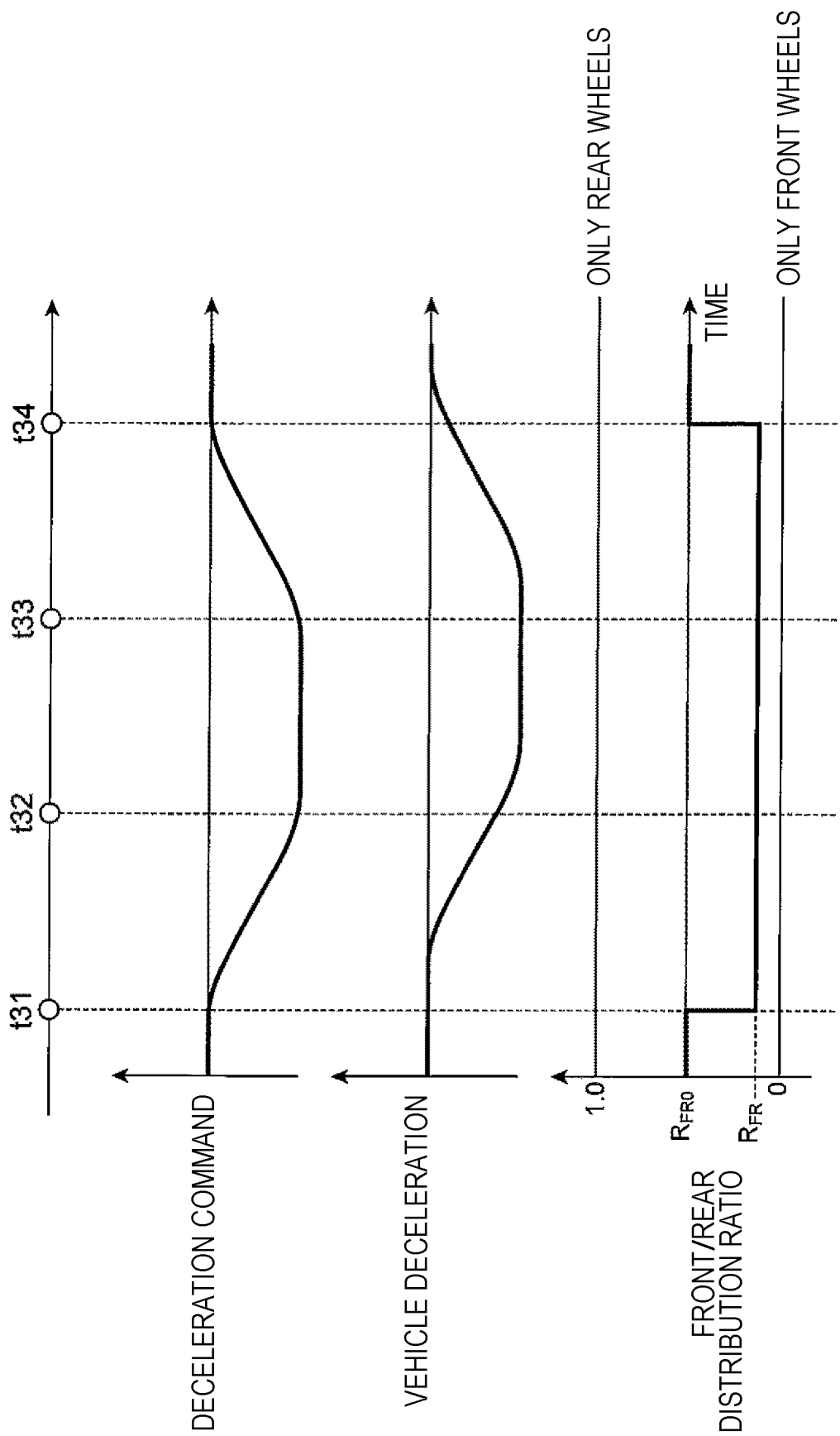
FIG. 8 is a diagram showing an example of a front/rear distribution ratio of brake fluid pressure when the vehicle decelerates as shown in FIG. 1.

FIG. 8 shows that the brake fluid pressure to the front brakes and the rear brakes is distributed based on the front/rear distribution ratio $R_{FR}$ calculated by (Expression 2) in the similar case as shown in FIG. 1. When the front/rear distribution ratio $R_{FR}$ is 1.0, this means that the brake fluid pressure is distributed only to (the brakes of) the rear wheels, and when the front/rear distribution ratio $R_{FR}$ is 0, this means that the brake fluid pressure is distributed only to (the brakes of) the front wheels. In addition, $R_{FR0}$ is the initial distribution ratio (for example, the distribution ratio in the case of four-wheel equal pressure braking).

In a situation where a driver or an external recognition sensor recognizes a front obstacle and a deceleration command is generated (from t31 to t34 in FIG. 8), by increasing the front/rear distribution ratio $R_{FR}$ of the brake fluid pressure of the front wheels compared to a predetermined initial distribution ratio $R_{FR0}$, the amount of fluid that can be generated for one wheel (the front left wheel or the front right wheel) of the front wheels is increased. Thus, it is possible to generate the braking force in a shorter time compared with the case where the front/rear distribution ratio of the brake fluid pressure is the initial distribution ratio $R_{FR0}$, and to improve the responsiveness.

Figure 9:
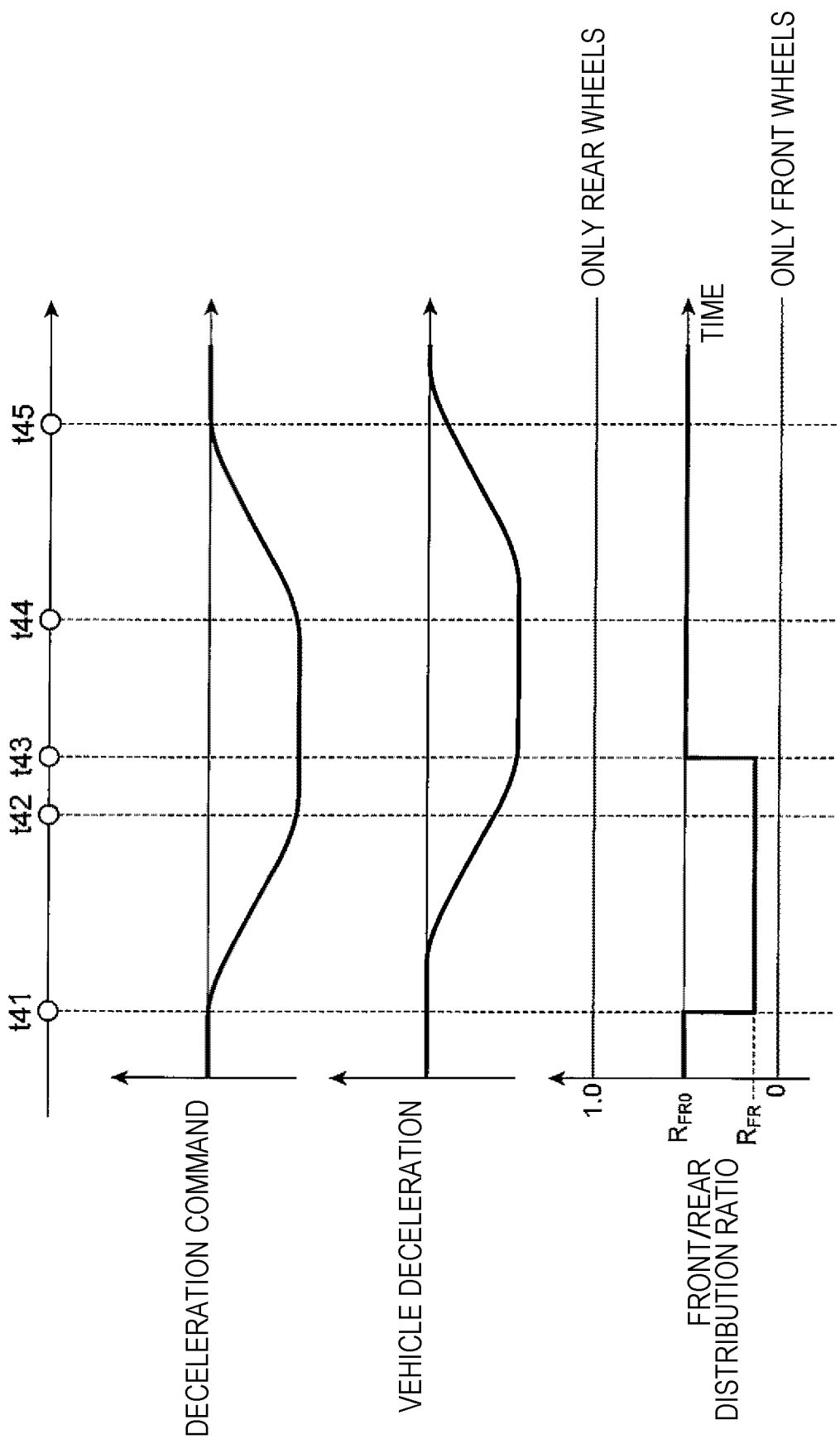
FIG. 9 is a diagram showing another example of a front/rear distribution ratio of brake fluid pressure when the vehicle decelerates as shown in FIG. 1.

As shown in FIG. 9, after the front/rear distribution ratio $R_{FR}$ of the brake fluid pressure of the front wheels is increased compared to the initial distribution ratio $R_{FR0}$ similarly to FIG. 8 and the vehicle deceleration becomes the same as the deceleration command (after t43 in FIG. 9), the front/rear distribution ratio $R_{FR}$ of the brake fluid pressure may be returned to the initial distribution ratio $R_{FR0}$ in order to prevent wear of the front wheel tires and the brake pedal. Furthermore, when the collision risk is higher than a predetermined value, the front/rear distribution ratio $R_{FR}$ is set to $R_{FR}=0$, and the brake fluid pressure may be distributed only to the front wheel brakes (the front brakes), or the distribution of the brake fluid pressure may be changed, according to the change in the collision risk, from the four wheels (the front brakes and the rear brakes) to two wheels (the front brakes or the rear brakes), or from two wheels (the front brakes or the rear brakes) to the four wheels (the front brakes and the rear brakes). In addition, when the vehicle decelerates while traveling on a straight road, the brake fluid pressure is distributed to the four wheel brakes (the front brakes and the rear brakes), and when the vehicle decelerates while traveling on a curved road, that is, when the vehicle avoids collision by steering operation, the steering responsibility by the deceleration in the early stage of steering is important, and the brake fluid pressure may be distributed to two wheel brakes of the front wheels or the rear wheels (the front brakes or the rear brakes).

Figure 10:
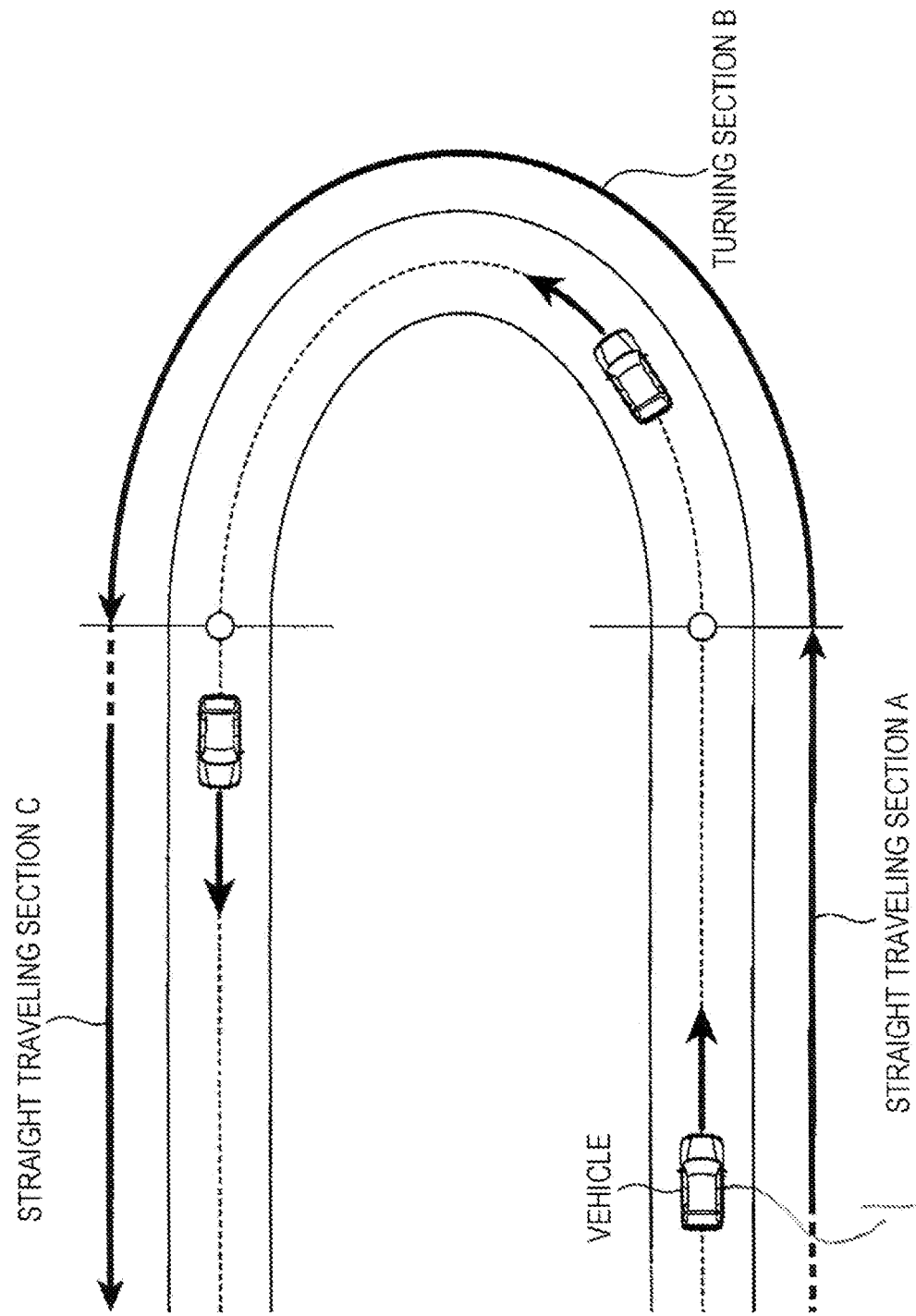
FIG. 10 is a diagram showing that a vehicle enters and passes through a left corner.

FIG. 10 shows that a vehicle enters a turning section (a section constituted by a curved road) B from a straight traveling section (a section constituted by a straight road) A and travels again in a straight traveling section C after passing through the turning section.

It has been described that the front/rear distribution ratio $R_{FR}$ of the brake fluid pressure is determined using the two-dimensional map of the collision risk according to the external information, the vehicle information, and the lateral motion information. However, when it is determined that the vehicle is traveling on a turning road like the turning section B in FIG. 10 from the external information and the lateral motion information, the collision risk in the turning section is determined to be higher than that in the straight traveling section, and the front/rear distribution ratio $R_{FR}$ of the brake fluid pressure may be determined so that the distribution ratio of the brake fluid pressure of the front wheels is increased compared to the rear wheels, or that the braking of only the two front wheels or the two rear wheels is performed.

Specifically, when the vehicle decelerates while traveling in the straight traveling section A as in the traveling scene shown in FIG. 10, a deceleration command value may be output to the front brakes and the rear brakes which are preset, and the brake fluid pressure may be distributed to the front brakes and the rear brakes. When the vehicle enters the turning section B from the straight traveling section A and decelerates, the deceleration command value may be output to the front brakes or the rear brakes, and the brake fluid pressure may be distributed to the front brakes or the rear brakes. When the vehicle passes through the turning section B and decelerates while traveling in the straight traveling section C, the deceleration command value may be output to the front brakes and the rear brakes, and the brake fluid pressure may be distributed to the front brakes and the rear brakes.

It has been described how to determine the distribution ratio of the brake fluid pressure to the front brakes and the rear brakes, and that the basic idea of the control by the vehicle control device according to the present invention. Hereinafter, a specific configuration of a vehicle control device that implements the control method (the vehicle control device according to the present invention) and a vehicle will be described.

[Configuration of Vehicle Equipped with Vehicle Control Device According to Present Invention]

Figure 11:
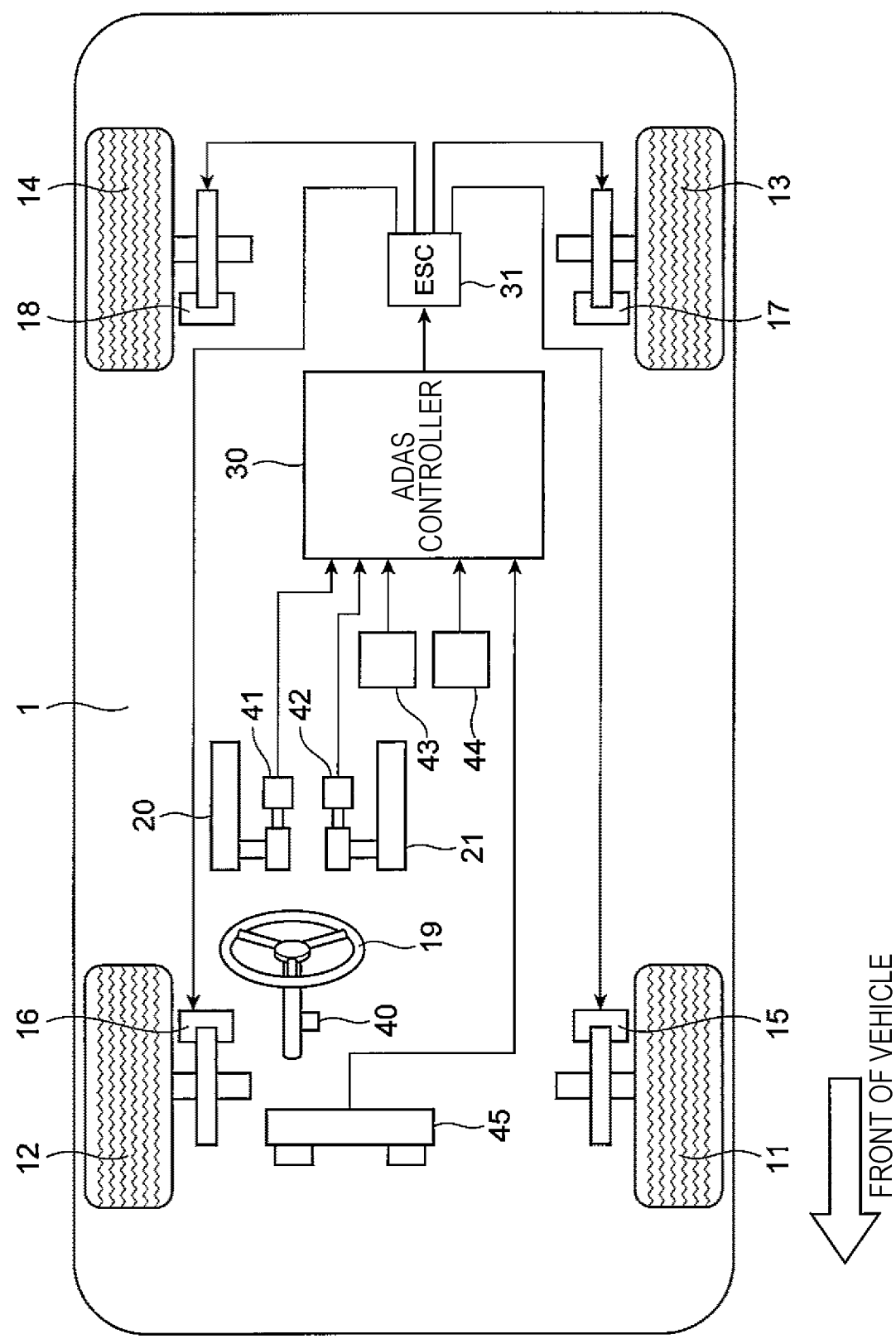
FIG. 11 is a diagram showing an overall configuration of a vehicle equipped with the vehicle control device according to the present invention.

FIG. 11 shows an overall configuration of a vehicle equipped with the vehicle control device according to the present invention.

In a vehicle 1 in the illustrated embodiment, a driver's steering amount of a steering wheel 19 is detected by a steering angle sensor 40, and an advanced driver assistance system (ADAS) controller (vehicle control device) 30 performs calculation processing such as calculation of the steering angular velocity. The driver's pressing amount of an accelerator pedal 20 is detected by an accelerator sensor 41, and is processed by the ADAS controller 30. The driver's pressing amount of a brake pedal 21 is detected by a brake sensor 42, and is processed by the ADAS controller 30. In accordance with these amounts, an ESC 31 controls a left-front-wheel braking device 15, a right-front-wheel braking device 16, a left-rear-wheel braking device 17, and a right-rear-wheel braking device 18, and this enables the braking force of the wheels (a left front wheel 11, a right front wheel 12, a left rear wheel 13, and a right rear wheel 14) to be controlled. For example, it is possible to generate deceleration action based on a deceleration longitudinal motion command obtained by the G-Vectoring or the like.

Next, the sensor group will be described.

As shown in FIG. 11, the steering angle sensor 40, the accelerator sensor 41, and the brake sensor 42 are mounted to a steering wheel 19, the accelerator pedal 20, and the brake pedal 21 respectively, and a lateral acceleration sensor 43 and a yaw rate sensor 44 are disposed near the center of the gravity of the vehicle 1. A logic for acquiring steering angular velocity information by differentiating the output of the steering angle sensor 40, a logic for acquiring the change speed of the pressing amount from each output of the accelerator sensor 41 and the brake sensor 42, a logic for acquiring the lateral jerk by differentiating the output of the lateral acceleration sensor 43, and a logic for acquiring the yaw angular acceleration by differentiating the output of the yaw rate sensor 44 are implemented in the ADAS controller 30 (see FIG. 12).

The vehicle 1 is further equipped with a stereo camera 45. The stereo camera 45 is constituted by two charge coupled device (CCD) camera which are image sensors arranged in the horizontal direction.

Here, the two CCD cameras constituting the stereo camera 45 individually image the object in front of the vehicle 1 from different coordinates of a vehicle fixed system, and output two pieces of image information of the two CCD cameras to a stereo image processing device which is mounted in the stereo camera 45. Although CCD cameras are used here, CMOS cameras may be used.

To the stereo image processing device, image information is input from the two CCD cameras, and the vehicle speed of the vehicle 1 is also input via the ADAS controller 30.

Based on these pieces of information, the stereo image processing device recognizes front information such as three-dimensional object data and white line data in front of the vehicle 1, and estimates a vehicle traveling path.

In the present embodiment, the ADAS controller 30 explicitly performs the G-Vectoring control to control the ESC 31. However, the calculation amount of the G-Vectoring control logic is very small, and the G-Vectoring control logic may be implemented in the stereo image processing device in the stereo camera 45. With such a configuration, it is possible to share the controller with a stereo camera or the like which has been mounted on the vehicle to constitute a collision-damage reduction brake, and to reduce the cost.

Furthermore, the G-Vectoring control logic can be implemented in the ESC 31 for the same reason that it can be implemented in the stereo image processing device in the stereo camera 45 as described above.

[Configuration of Vehicle Control Device According to Present Invention]

Figure 12:
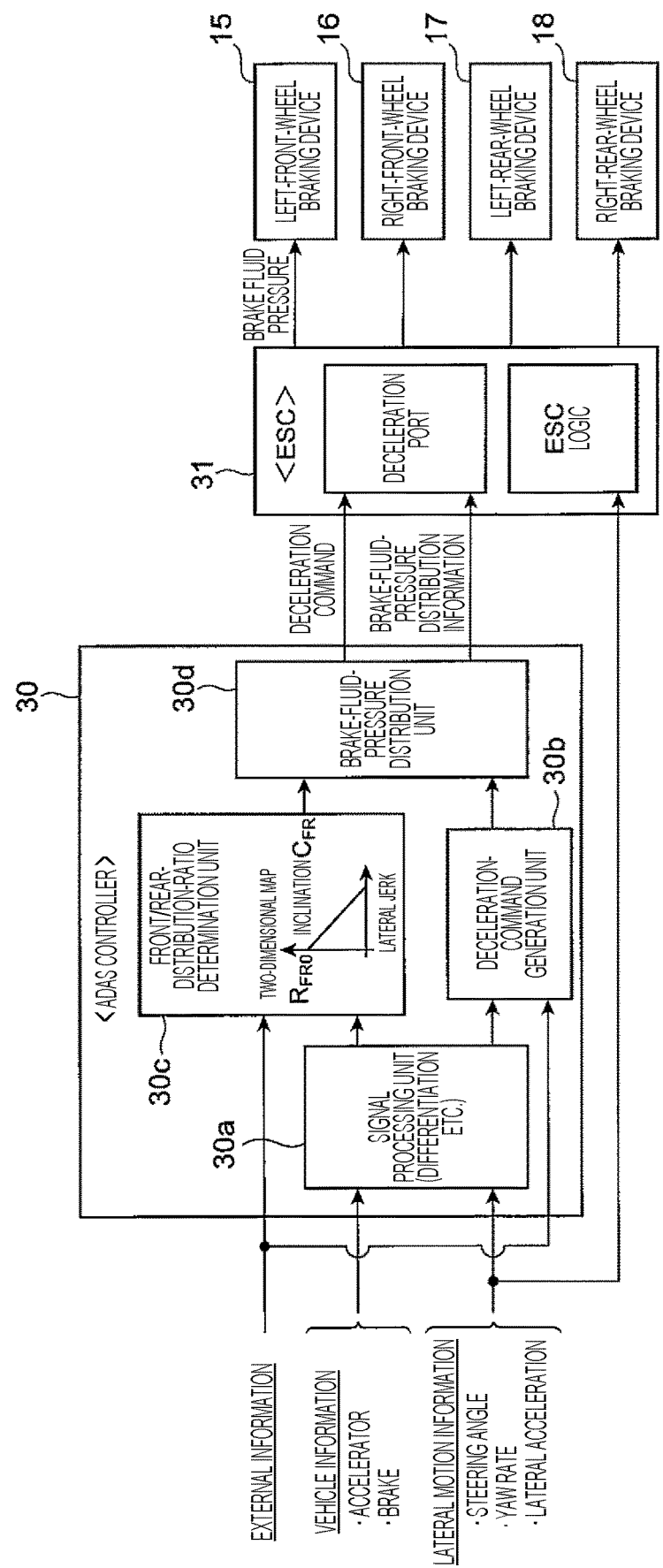
FIG. 12 is a diagram showing an internal configuration of an ADAS controller (the vehicle control device according to the present invention) and an ESC shown in FIG. 11.

FIG. 12 shows a signal transmission configuration of the ADAS controller (the vehicle control device according to the present invention) 30 and the ESC 31 shown in FIG. 11.

As shown in the drawing, the ADAS controller 30 mainly includes a signal processing unit 30a, a deceleration-command generation unit 30b, a front/rear-distribution-ratio determination unit 30c, and a brake-fluid-pressure distribution unit 30d.

Information input to the ADAS controller 30 are lateral motion information, vehicle information, and external information on the surroundings of the vehicle. The lateral motion information includes the information related to the lateral motion of the vehicle, such as the steering angle, the yaw rate, and the lateral acceleration, from the steering angle sensor 40, the yaw rate sensor 44, the lateral acceleration sensor 43, the accelerator sensor 41, the brake sensor 42, the stereo camera 45, and the like. The vehicle information includes driver information, such as the accelerator, and the brake. The external information is obtained from image information obtained from the stereo camera 45 From the lateral motion information, by performing signal processing such as differentiation by the signal processing unit 30a, the steering angular velocity, the yaw angular acceleration, and the lateral jerk are calculated. From the vehicle information, the accelerator change speed and the brake change speed are calculated based on each change amount per unit time by the signal processing unit 30a. From the lateral jerk calculated by the signal processing unit 30a, the external information, and the like, the deceleration-command generation unit 30b calculates a deceleration command by automatic brake, the G-vectoring control, or the like.

On the other hand, as shown in FIG. 12, the front/rear-distribution-ratio determination unit 30c of the ADAS controller 30 stores a two-dimensional map (see FIGS. 6 and 7) in which the vertical axis represents the front/rear distribution ratio $R_{FR}$, and the horizontal axis represents the steering angular velocity, the yaw angular acceleration, the lateral jerk, the accelerator change speed, the brake change speed, the time to collision TTC to an obstacle, or the like. The front/rear-distribution-ratio determination unit 30c calculates the front/rear distribution ratio $R_{FR}$ of the brake fluid pressure from the two-dimensional map (according to the inclination $C_{FR}$), and the brake-fluid-pressure distribution unit 30d outputs, to the ESC 31, the deceleration command calculated by the deceleration-command generation unit 30b and the control command value related to the front/rear distribution ratio $R_{FR}$ calculated by the front/rear-distribution-ratio determination unit 30c as brake-fluid-pressure distribution information.

The ESC 31 controls, based on the information (the control command value) and the like transmitted from brake-fluid-pressure distribution unit 30d, the brake fluid pressure of each wheel (specifically, the left-front-wheel braking device 15, the right-front-wheel braking device 16, the left-rear-wheel braking device 17, and the right-rear-wheel braking device 18 provided to the respective wheels), and controls the braking force of each wheel.

Figure 13:
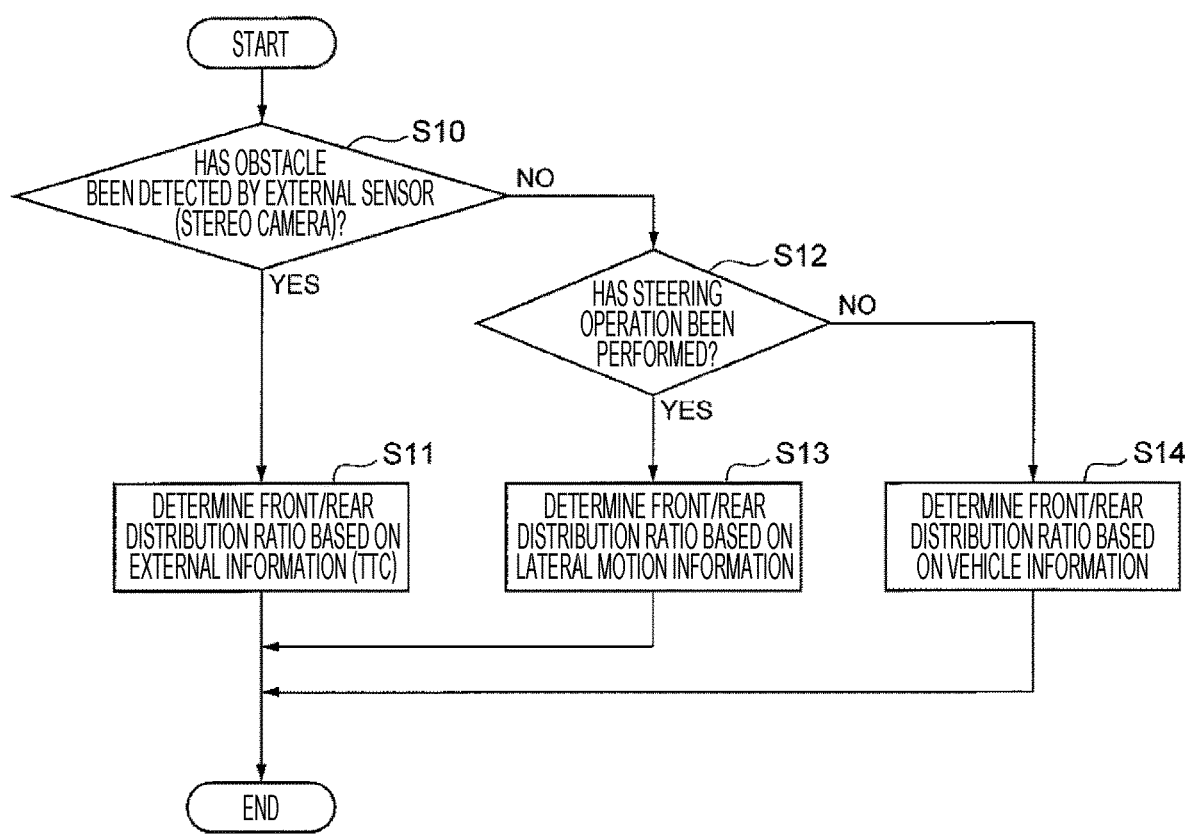
FIG. 13 is a diagram showing a flowchart of processing of a front/rear distribution ratio determination unit shown in FIG. 12.

FIG. 13 shows an example of a flowchart of specific processing of the front/rear-distribution-ratio determination unit 30c of the ADAS controller 30.

First, it is determined whether an obstacle has been detected by an external sensor such as the stereo camera 45 (S10). When an obstacle has been detected, the front/rear distribution ratio $R_{FR}$ of the brake fluid pressure is determined based on the external information (the time to collision TTC to the obstacle) obtained from the detection (S11). When no obstacle has been detected, it is determined whether steering operation has been performed (S12). When steering operation has been performed, the front/rear distribution ratio $R_{FR}$ of the brake fluid pressure is determined based on the lateral motion information (the steering angular velocity, the yaw angular acceleration, and the lateral jerk) (S13). When steering operation has not been performed, the front/rear distribution ratio $R_{FR}$ of the brake fluid pressure is determined based on the vehicle information (the brake change speed and the accelerator change speed) (S14). When an external sensor, such as the stereo camera 45, is not mounted on the vehicle, the flowchart shown in FIG. 13 may be started from the determination of "steering operation has been performed. (S12)".

In the present embodiment, it has been described that the ADAS controller 30 (the signal processing unit 30a, the deceleration-command generation unit 30b, the front/rear-distribution-ratio determination unit 30c, and the brake-fluid-pressure distribution unit 30d) performs the signal processing, the deceleration command generation, the determination of the front/rear distribution ratio of the brake fluid pressure using the two-dimensional map, and the brake fluid pressure distribution. However, this is merely an example, and an ECU other than the ADAS controller 30 may be used to perform the processing, for example.

[Specific Example of Control by Vehicle Control Device According to Present Invention]

Figure 14:
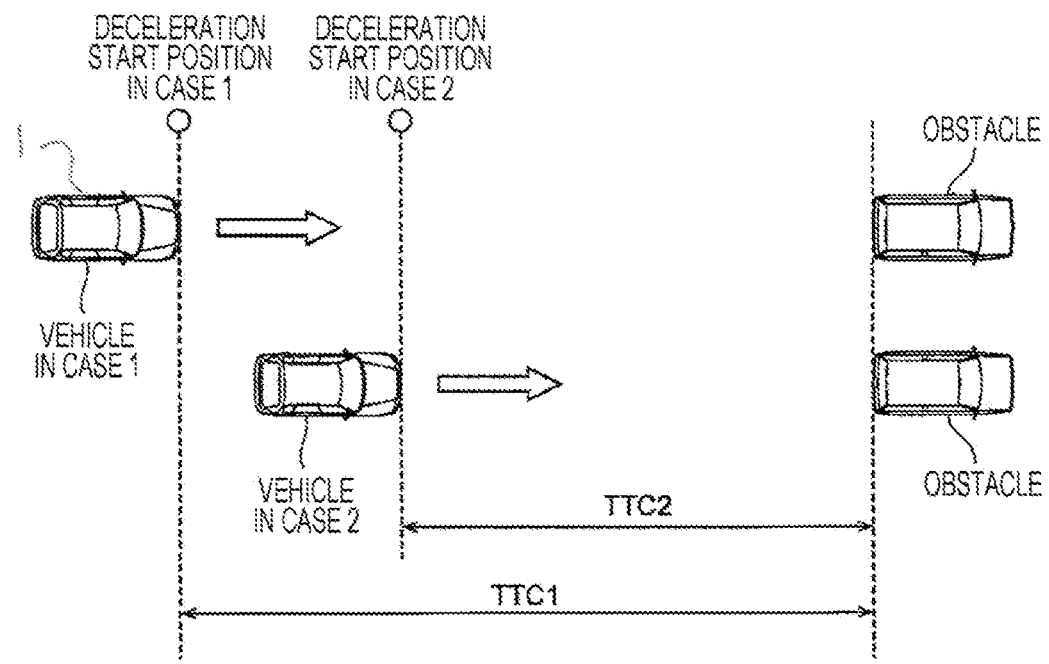
FIG. 14 is a diagram showing a braking state based on the difference between deceleration start distances with respect to an obstacle.

FIG. 14 shows a state of braking in two cases (a case and a case 2) having difference deceleration start distances to an obstacle when there is a front obstacle on a straight road.

Figure 15:
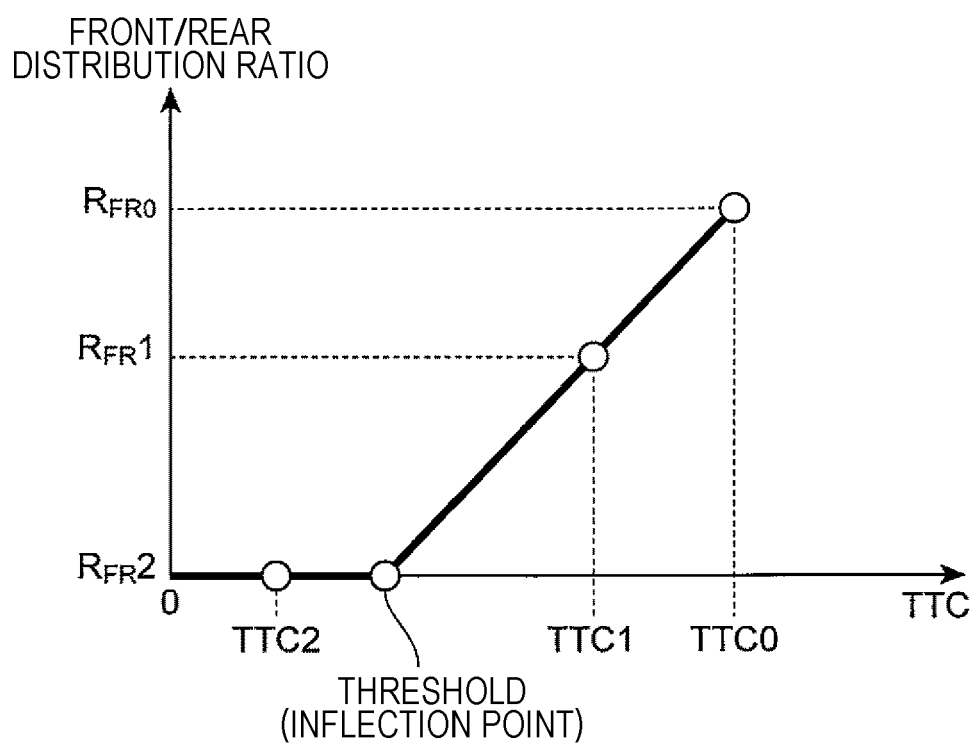
FIG. 15 is a diagram showing a map of a front-to-rear distribution ratio of brake fluid pressure based on the difference between deceleration start distances with respect to an obstacle.

It is assumed that, in the external information (the time to collision TTC to the obstacle) obtained from the stereo camera 45 while a vehicle is traveling on a straight road along the traveling direction, the vehicle in the case 1 has TTC1, and the vehicle in the case 2 has TTC2 (<TTC1), and the vehicle start to decelerate from each of those positions. At this time, as shown in FIG. 15, the front/rear distribution ratio $R_{FR}$ is calculated based on the map (the map having a threshold or an inflection point) of the front/rear distribution ratio $R_{FR}$ with respect to the time to collision TTC of the ADAS controller 30. The brake fluid pressure is distributed to the front and the rear of the vehicle in the case 1 so that the ratio is to be $R_{FR}1$, and is distributed to the front and the rear of the vehicle in the case 2 so that the ratio is to be $R_{FR}2$ (<$R_{FR}1$). In this case, since the TTC of the vehicle in the case 1 is smaller than TTC0, the front/rear distribution ratio $R_{FR}1$ of the brake fluid pressure of the front wheels is increased (for example, compared to the front/rear distribution ratio $R_{FR0}$ in the case of the four-wheel equal pressure braking). In addition, since the TTC of the vehicle in the case 2 is smaller than TTC1 and smaller than the threshold, the front/rear distribution ratio $R_{FR}2$ of the brake fluid pressure is 0, and the brake fluid pressure is controlled so as to be distributed only to the two front wheels (the front left wheel and the front right wheel). Accordingly, as shown in FIG. 16, each vehicle in the case 1 and in the case 2 is stopped before colliding with the obstacle.

As described above, according to the present embodiment, by distributing the brake fluid pressure according to the external information (TTC), which is a collision risk between an own vehicle and an obstacle, obtained from the stereo camera 45, so that the difference in the brake fluid pressure between the front wheels and the rear wheels (the front brakes and the rear brakes) to be small when the TTC is large (the collision risk is low), and that the difference in the brake fluid pressure between the front wheels and the rear wheels (the front brakes and the rear brakes) to be large when the TTC is small (the collision risk is high), it is possible to change the deceleration responsiveness of the vehicle to a deceleration command for the brakes.

In this description, it is described that the collision risk is determined according to the external information (TTC) obtained from the stereo camera 45 to control the front/rear distribution (ratio) of the brake fluid pressure. However, if an external sensor such as the stereo camera 45 is not mounted, the collision risk may be calculated from lateral motion information such as the steering operation (steering angle operation). Then, when the steering angle operation is performed to turn the vehicle (that is, when the collision risk is determined to be high), the distribution ratio of the brake fluid pressure may be changed so that the difference in the distribution ratio of the brake fluid pressure between the front wheels and the rear wheels (the front brakes and the rear brakes) is to be increased compared to the case where the steering angle operation is not performed (that is, the collision risk is determined to be low).

As described above, according to the present embodiment, by changing the front/rear distribution of the brake fluid pressure (the distribution ratio of the brake fluid pressure between the front brakes and the rear brakes) using the lateral motion information, the vehicle information, the collision risk obtained from the external information, and the traveling scene, it is possible to improve the deceleration responsiveness of the vehicle to a brake deceleration command.

Note that, the present invention is not limited to the above embodiment and includes various modifications. For example, the above embodiment has been described in detail in order for the present invention to be easily understood, and is not necessarily limited to those having all the described configurations. Furthermore, a part of the configuration of an embodiment can be replaced with the configuration of another embodiment, and the configuration of an embodiment can be added to the configuration of another embodiment. Moreover, other configurations can be added, deleted, or replaced with respect to a part of the configuration of each embodiment.

In addition, the above configurations, functions, processing units, processing means, and the like may be implemented by hardware by, for example, designing a part or all of them in an integrated circuit. Alternatively, the above configurations, functions, and the like may be implemented by software by interpreting and executing programs for implementing each function by a processor. Information, such as programs, tables, and files, that implements the functions can be stored in a storage device such as a memory, a hard disk, a solid-state drive (SSD), or a recording medium such as an IC card, an SD card, or a DVD.

Note that, control lines and information lines considered to be necessary for the description are shown, and all control lines and information lines on products are not necessarily shown. In practice, it can be considered that almost all the configurations are mutually connected.

REFERENCE SIGNS LIST

1 Vehicle
11 Left front wheel
12 Right front wheel
13 Left rear wheel
14 Right rear wheel
15 Left-front-wheel braking device
16 Right-front-wheel braking device
17 Left-rear-wheel braking device
18 Right-rear-wheel braking device
19 Steering
20 Accelerator pedal
21 Brake pedal
30 ADAS controller (vehicle control device)
31 ESC
40 Steering angle sensor
41 Accelerator sensor
42 Brake sensor
43 Lateral acceleration sensor
44 Yaw rate sensor
45 Stereo camera

The invention claimed is:

1. A vehicle control device configured to adjust a distribution ratio of brake fluid pressure to brakes provided at front, rear, right, and left of a vehicle, and to control a traveling state of the vehicle, wherein
the vehicle control device is further configured to change the distribution ratio of the brake fluid pressure between the front brakes and the rear brakes based on a collision risk of the vehicle,
wherein the vehicle control device is further configured to distribute the brake fluid pressure only to the rear brakes based on the collision risk having a value relative to a predetermined value,
wherein the vehicle control device is further configured to calculate the distribution ratio based on a map having an inflection point with respect to a second time to a collision differing from a first time to collision.

2. The vehicle control device according to claim 1, wherein the vehicle control device is further configured to calculate the collision risk based on vehicle information, or lateral motion information.

3. The vehicle control device according to claim 1 comprising:
a longitudinal acceleration controller configured to control longitudinal acceleration of the vehicle according to lateral motion generated by steering angle operation of the vehicle, wherein
the vehicle control device is further configured to change the distribution ratio of the brake fluid pressure, when the steering angle operation is performed, such that the difference in the distribution ratio of the brake fluid pressure between the front brakes and the rear brakes is increased compared to the difference when the steering angle operation is not performed.

4. The vehicle control device according to claim 1, wherein the vehicle control device is further configured to output a deceleration command value to the front brakes and the rear brakes which are preset, and to output the deceleration command value to the front brakes or the rear brakes when a predetermined condition is satisfied.

5. The vehicle control device according to claim 4, wherein the vehicle control device is further configured to distribute the brake fluid pressure to the front brakes and the rear brakes when the vehicle decelerates while traveling on a straight road, and to distribute the brake fluid pressure to the front brakes or the rear brakes when the vehicle decelerates while traveling on a curved road.

6. The vehicle control device according to claim 1, wherein the vehicle control device is further configured to output a deceleration command value only to the front brakes or the rear brakes which are preset, and to output the deceleration command value to the front brakes and the rear brakes when a predetermined condition is satisfied.

7. The vehicle control device according to claim 6, wherein the vehicle control device is further configured to distribute the brake fluid pressure to the front brakes or the rear brakes when the vehicle decelerates while traveling on a curved road, and to distribute the brake fluid pressure to the front brakes and the rear brakes when the vehicle decelerates while traveling on a straight road.

8. The vehicle control device of claim 1, wherein the first time to collision and the second time to collision are respectively associated with a first distribution ratio and a second distribution ratio, such that the lower of the first time to collision and the second time to collision corresponds to the lower of the first distribution ratio and the second distribution ratio, and the higher of the first time to collision and the second time to collision corresponds to the higher of the first distribution ratio and the second distribution ratio.

9. A vehicle control device configured to adjust a distribution ratio of brake fluid pressure to brakes provided at front, rear, right, and left of a vehicle and to control a traveling state of the vehicle, the device comprising:
  a longitudinal acceleration controller configured to control longitudinal acceleration of the vehicle based on lateral jerk generated by steering angle operation of the vehicle, wherein
  the vehicle control device is further configured to change the distribution ratio of the brake fluid pressure between the front brakes and the rear brakes based on a collision risk having a value relative to a predetermined value such that the brake fluid pressure is distributed only to the rear brakes,
  wherein the vehicle control device is further configured to calculate the distribution ratio based on a map having an inflection point with respect to a second time to a collision differing from a first time to collision.

* * * * *